(12) United States Patent
Rammler et al.

(10) Patent No.: US 7,061,135 B2
(45) Date of Patent: Jun. 13, 2006

(54) DEVICE FOR GENERATION OF ELECTRICAL POWER

(75) Inventors: Andreas Rammler, Weisskirchen (AT); Volker Kienberger, Linz (AT); Peter Priegl, Bisamberg (AT)

(73) Assignee: VA Tech Hydro GmbH & Co., Vienna (AT)

( * ) Notice: Subject to any disclaimer, the term of this patent is extended or adjusted under 35 U.S.C. 154(b) by 158 days.

(21) Appl. No.: 10/793,805

(22) Filed: Mar. 8, 2004

(65) Prior Publication Data

US 2004/0207209 A1    Oct. 21, 2004

(30) Foreign Application Priority Data

Mar. 6, 2003    (AT) ............................... A 331/2003

(51) Int. Cl.
    *F03B 13/10*    (2006.01)
(52) U.S. Cl. .............................. 290/54; 290/43; 405/78
(58) Field of Classification Search .................. 290/43, 290/54; 405/78
    See application file for complete search history.

(56) References Cited

U.S. PATENT DOCUMENTS

| | | | | |
|---|---|---|---|---|
| 4,289,971 A | * | 9/1981 | Ueda ............................ | 290/52 |
| 4,468,153 A | * | 8/1984 | Gutierrez Atencio ......... | 405/78 |
| 4,755,690 A | | 7/1988 | Obermeyer et al. ........... | 290/52 |
| 4,804,855 A | * | 2/1989 | Obermeyer .................... | 290/54 |
| 5,825,094 A | * | 10/1998 | Hess ............................ | 290/54 |
| 6,146,096 A | * | 11/2000 | Winkler ........................ | 415/220 |
| 6,281,597 B1 | | 8/2001 | Obermeyer et al. ........... | 290/54 |
| 6,568,878 B1 | * | 5/2003 | Woodall et al. ............... | 405/25 |
| 6,930,407 B1 | * | 8/2005 | Panholzer ..................... | 290/53 |

OTHER PUBLICATIONS

Va Tech VOEST MCE Corp., Sep. 25, 2002.
VA Tech VOEST MCE Corp., Jul. 15, 2002.

* cited by examiner

*Primary Examiner*—Nicholas Ponomarenko
(74) *Attorney, Agent, or Firm*—Greenblum & Bernstein, P.L.C.

(57) ABSTRACT

Device and process generating electrical power from flowing medium. Device includes turbine generator units connected to form module(s), and at least two fixed-position structures arranged to form a waterway. Module(s) are arranged between the fixed-position structures to be raised and lowered. In this way, high water level is produced upstream of the at least one module and low water level is produced downstream of module(s). An auxiliary apparatus provided on each fixed-position structure extends above upper edges of fixed-position structures, and a lifting device is arranged to lift the module(s) that are guided, at least partially, by the at least one auxiliary apparatus. In a lifting procedure, module(s) are raised above the upper edges of the fixed-position structures. The instant abstract is neither intended to define the invention disclosed in this specification nor intended to limit the scope of the invention in any way.

33 Claims, 2 Drawing Sheets

DEVICE FOR GENERATION OF ELECTRICAL POWER

CROSS-REFERENCE TO RELATED APPLICATIONS

The present application claims priority under 35 U.S.C. § 119 of Austrian Patent Application No. A331/2003 filed Mar. 6, 2003, the disclosure of which is expressly incorporated by reference herein in its entirety.

BACKGROUND OF THE INVENTION

1. Field of the Invention

The instant application relates to a device for generating electrical power from a flowing medium, e.g., water, that includes a number of turbine generator units which, at least in places, are arranged one above the other and/or alongside one another and are connected to one another to form one or more modules. The device also includes at least two fixed-position structures which are arranged essentially alongside one another and one or more modules are arranged between the at least two fixed-position structures such that it/they can be raised and lowered. In this way, a high water level is produced upstream of the module and a low water level is produced downstream of the module. The invention also relates to a process for converting a waterway to a system for generating electrical power from a flowing medium.

2. Discussion of Background Information

Systems for generating electrical power in a waterway can be formed by inserted modules, in which a number of turbine generator units arranged one above the other and/or alongside one another at least in places and connected to one another form one or more of these modules, e.g., as is known from U.S. Pat. No. 6,281,597 B1. In such system, it is necessary to be able to raise a module out of the waterway in order to open up the waterway completely when required (e.g., where there is a flood threat). In order to make it possible to reliably raise the module, guides, in which the module is guided during raising, are provided in the fixed-position structures of the waterway. In this manner, the position of the module is fixed in all raised positions, and the intended operating position is reached reliably, particularly during lowering.

In systems in which the upper edge of the fixed-position structures is only slightly above the maximum water level, so that the length of the guides which are provided in the fixed-position structures are too short to ensure adequate guidance of the module when the module is being raised out of the waterway, it has therefore not been possible up until now to use a module such as this for generation of electrical power.

SUMMARY OF THE INVENTION

The present invention, therefore, provides an apparatus and process for easily using a module even in waterways with fixed-position structures whose upper edges are only slightly above the maximum water level.

For the device for generating electrical power, the instant invention provides at least one auxiliary apparatus on each of the fixed-position structures, such that the auxiliary apparatuses extend above the upper edge of the fixed-position structures, and in which the module or the modules are arranged to be guided at least partially during a lifting process. In this way, the module or the modules can be raised above the upper edge of the fixed-position structures by a lifting device and guided at least partially in the auxiliary apparatus, such that it possible to raise the module out of the flowing medium in a guided manner even when the high water level is at its maximum.

This simple apparatus makes it possible to use even waterways with low fixed-position structures and to ensure that they are reliably guided over the entire lifting range. This considerably extends the field in which a module for generation of electrical power can be used.

When a module is in the operating position, a suction tube is advantageously connected downstream of the module to at least one turbine generator unit for this module, preferably such that it can be closed, which improves the efficiency of the turbine generator unit and hence the electrical "yield." The suction tube closure allows individual turbine generator units to be connected and disconnected, so that it is possible in this way to regulate flow through the module, and hence also the high water level.

If the module can be raised and lowered together with the suction tube, the waterway can be opened up completely.

The device is simplified if the module and/or the suction tube rest or rests on a fixed-position base structure in the operating position, since no additional structures are then required to hold the module in the operating position.

The leakage losses and hence the energy losses can essentially be avoided by providing a sealing device on the fixed-position structures and/or on the base structure and/or on the module and/or on the suction tube, since this means that all of the medium must flow through the turbine generator unit and can be used for generation of electrical power.

The maintenance of a module is very considerably simplified if at least one turbine generator unit of a module is arranged such that it can be disconnected from the module. This allows individual turbine generator units to be replaced without having to remove the module from the waterway.

Existing waterways can very advantageously be converted to a system for generating electrical power by choosing an existing system with at least two fixed-position structures that form a part of the waterway and by arranging at least one auxiliary device on each of the two fixed-position structures which are arranged alongside one another. The auxiliary devices extend above the upper edges of the fixed-position structures, with one or more, preferably prefabricated, modules having a number of turbine generator units which are arranged one above the other and/or alongside one another at least in places and are connected to one another to form one or more modules being inserted into the auxiliary devices guidably arranged to be at least partially raised and lowered in the auxiliary devices. In this manner, it is possible to raise the module out of the flowing medium above the upper edge of the fixed-position structures in a guided manner even when the high water level it as its maximum. Further, if required, a lifting device can be arranged on the waterway in order to raise and lower the module or modules. This process allows existing waterways to be converted very easily and quickly to devices for generation of electrical power.

The present invention is directed to a device for generating electrical power from a flowing medium. The device includes a number of turbine generator units connected to one another to form at least one module, and at least two fixed-position structures structured and arranged essentially alongside each other to form a part of a waterway. The at least one module is structured and arranged between the at least two fixed-position structures to be raised and lowered. In this way, a high water level is produced upstream of the at least one module and a low water level is produced downstream of the at least one module. At least one auxiliary apparatus is provided on each of the two fixed-position structures that extends above an upper edge of the fixed-position structures, and a lifting device structured and arranged to lift the at least one module, which is guided, at least partially, by the at least one auxiliary apparatus, such that, in a lifting procedure, the least one module is raised above the upper edges of the fixed-position structures.

According to another feature of the invention, in the lifting procedure, the at least one module can be raised out of the flowing medium. The at least one module may be raised out of the flowing medium when a high water level is maximum.

In accordance with another feature of the invention, the lifting device can be guided at least partially in the auxiliary apparatus.

According to still another feature of the present invention, the flowing medium may be water.

The at least one module may be composed of the number of turbine generator units arranged at least one of one above the other and alongside one another. Further, the number of turbine generator units forming the at least one module can be connected to one another.

Moreover, the lifting device can be structured to raise the at least one module from a lowered operating position in a flow into a raised position in which the at least one module is entirely outside the flow. A suction tube may be connected to and downstream from at least one of the number of turbine generator units, when the at least one module is in the operating position. The at least one module can be structured and arranged so that it is raised and lowered together with the suction tube. Further, the suction tube can be closed.

According to the invention, guide devices may be located in the fixed-position structures. The at least one module can be raised and lowered in the guide devices at least in an area of the fixed-position structures.

Further, a base structure can be positionally fixed in the operating position. At least one of the at least one module and a suction tube may be arranged to rest on the base structure. A sealing device can be located at least one of on the fixed-position structures, on the base structure, on the at least one module, and on the suction tube. The sealing device can essentially prevent flow between at least one of the at least one module, the suction tube, the fixed-position structures, and the base structure.

According to still another feature of the instant invention, at least one of the number of turbine generator units of the at least one module can be structured and arranged to be disconnectable from the at least one module.

The present invention is directed to a process for converting a waterway into a system for generating electrical power from a flowing medium. The process includes arranging at least one auxiliary device on each of at least two fixed-position structures located in the waterway, such that the at least one auxiliary devices extend above upper edges of the at least two fixed-position structures, and inserting at least one module, composed of a plurality of turbine generator units, between the auxiliary devices.

In accordance with a feature of the invention, the process can further include selectively raising and lowering the at least one module positioned between the auxiliary devices.

According to another feature of the invention, the process includes selectively raising and lowering the at least one module between at least one of the at least two fixed-position structures and the auxiliary devices. Further, the process includes raising the at least one module above the upper edges of the two fixed-position structures. When the at least one module is raised above the upper edges of the two fixed-position structures, the at least one module can be raised out of the flowing medium. The at least one module may be raised out of the flowing medium even when a high water level of the waterway is at a maximum.

In accordance with a feature of the invention, the at least two fixed position structures can be arranged alongside each other.

According to another feature of the present invention, the process can include a lifting device on the waterway to raise and lower the at least one module.

The at least one module can be formed by the plurality of turbine generator units arranged at least one of one above the other and alongside one another, and connected to one another.

Further, the at least one module may be insertable into the auxiliary devices to be at least partially raised and lowered.

According to still another feature of the instant invention, a suction tube can be connected to and downstream from at least one of the plurality of turbine generator units of the at least one module, and the at least one module may be raised and lowered together with the suction tube. The at least one suction tube can be arranged in the waterway in such a manner that the suction tube interacts with at least of the plurality of turbine generator units in an operating position. In the operating position, an essentially continuous flow channel can be produced from a high water level through the at least one turbine and the suction tube to the low water level. Further, the suction tube can remain in the waterway while the at least one module is raised.

According to a further feature of the invention, the two fixed-position structures can include guide devices, and the at least one module may be guided to be raised and lowered in the guide devices.

In accordance with the instant invention, the lifting device may be attached to the two fixed-position structures.

In accordance with still yet another feature of the present invention, at least when the at least one module is in an operating position, the process can further include sealing a space at least one of between the at least one module and a base structure and between the at least one module and the fixed-position structure. The space can be sealed is essentially liquid-tight.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

Figure 1:
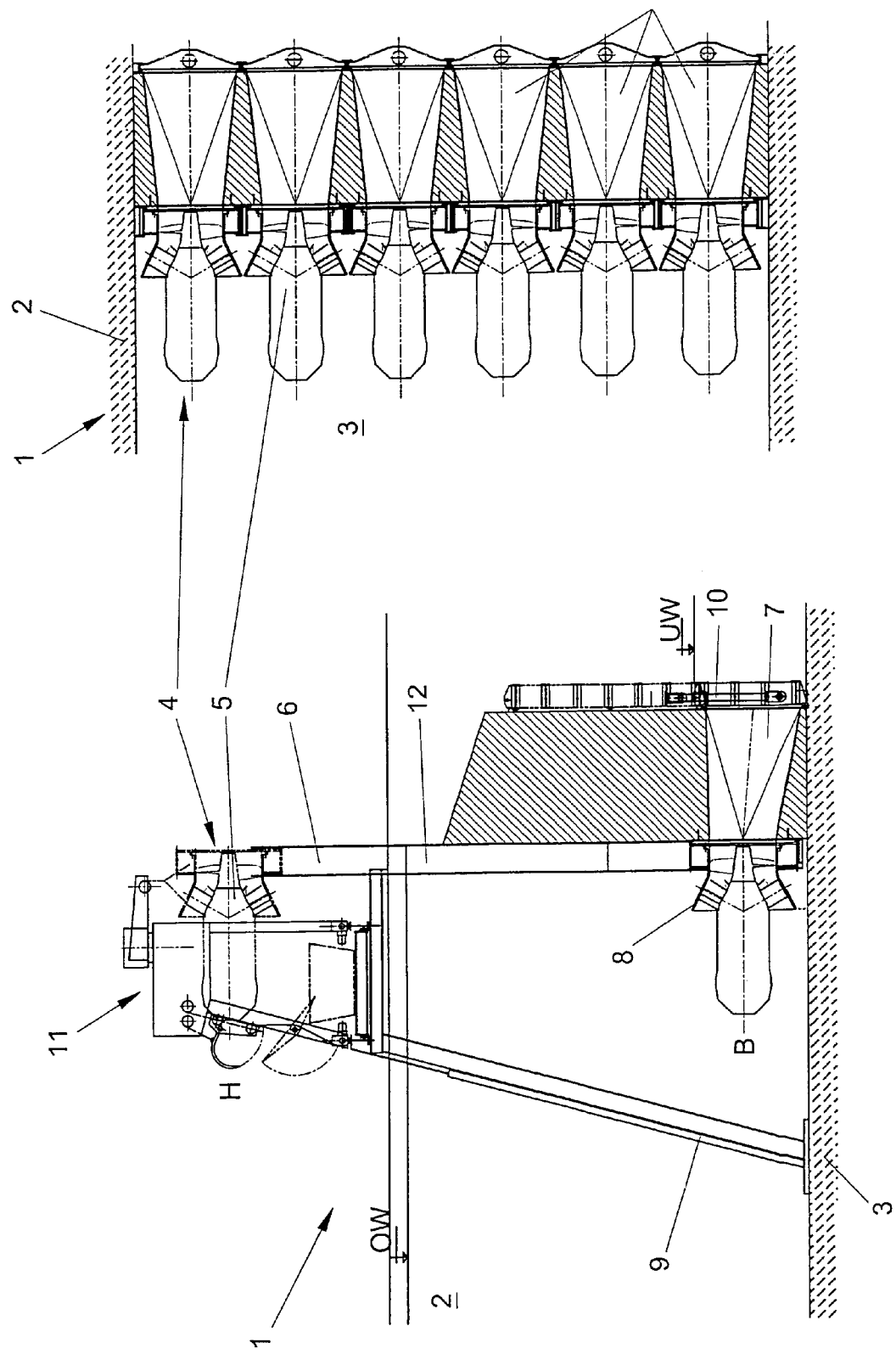
FIGS. 1a and 1b show a plan view and a side view of an exemplary embodiment of the system according to the invention.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

FIGS. 1a and 1b shows a waterway 1 which is bounded on the left and right by a respective, preferably already existing, fixed-position structure 2, more clearly illustrated in FIG. 1b. Furthermore, waterway 1 is bounded at the bottom by a likewise existing fixed-position base structure 3, see FIG. 1a. Thus, the two fixed-position structures 2 and base structure 3 form a channel or a sluice, such as that which can be found in an artificial channel or an opened lock for vessels.

The preferably already existing waterway 1 can now be used for the purpose of generating electrical power, i.e., a module 4, comprising a number of turbine generator units 5 that are arranged alongside one another and are connected to one another to form module 4, is inserted into waterway 1. From this construction, a high water level OW upstream of module 4 and a low water level UW downstream from it, as is required to generate power, necessarily results. Turbine generator unit 5 comprises a generator, for example a pipe generator with permanent magnet excitation, and a turbine, e.g., a Kaplan turbine, which is connected to the generator. Fundamentally, any other feasible turbine generator unit 5, e.g., in a Straflo configuration, may be used for this purpose. The turbine of a turbine generator unit 5 is connected downstream to a suction tube 7, in order to improve the efficiency of the turbine. In addition, an inlet tube 8 is provided upstream of the turbine, in which support vanes and guide vanes can be arranged in a known manner. A turbine generator unit 5 furthermore has a closure device 10, in this case a suction tube closure, which is arranged downstream, in the form of a flood gate, in order to make it possible to stop the flow through turbine generator unit 5. The medium flows through turbine generator units 5 from high water OW to low water UW, as a result of which, in a known manner, the turbines, and in consequence also the generators, are caused to rotate, thereby generating electrical power.

In certain situations, e.g., when a flood occurs or for maintenance, it can be necessary to raise module 4 out of waterway 1, in order either to open up waterway 1 or to make module 4 accessible. A lifting device 11 is provided for this purpose, which is arranged on waterway 1, preferably on fixed-position structures 2, and can be connected to module 4 in order to raise it.

Furthermore, a guard 9 can also be arranged upstream of module 4, as has been known for a long time, in order to prevent floating objects from floating through turbine generator units 5, which could lead to damage to turbine generator units 5. The example shown in FIG. 1 also shows a guard cleaning device, which is likewise known.

In order to make it possible to raise module 4 reliably and in a controlled manner, guides 12 are provided in fixed-position structures 2, in which module 4 is guided by a suitable guide device, e.g., guide rollers or the like, thus fixing the position in the flow direction. In waterways 1 with low side walls, i.e., in systems in which the upper edge of fixed-position structure 2 is only slightly above maximum high water level OW, this necessary guidance would not be ensured since, in situations such as these, module 4 would have to be raised above the upper edge of fixed-position structures 2 in order to open up waterway 1 entirely or to make module 4 accessible. In this context, "slightly" means essentially the situation in which the difference between maximum high water level OW and the upper edge of fixed-position structure 2 is not sufficient to make it possible to reliably raise module 4 out of the waterway, guided in guides 12.

An auxiliary guide 6 is now provided as an auxiliary apparatus for this purpose, extending beyond the upper edge of fixed-position structure 2 and essentially forming an extension of guide 12 for fixed-position structure 2. Module 4 can now be raised to a raised position H, even above the upper edge of fixed-position structure 2, while maintaining the necessary guidance.

In the example shown in FIG. 1, suction tubes 7 are not part of module 4, but are arranged separately in waterway 1. When module 4 is in operating position B, turbine generator units 5 and the respectively associated suction tube 7 are joined together to form a continuous flow channel. Since suction tube 7 remains in waterway 1, less weight needs be raised, of course, so that, of course, lifting device 11 may also be designed to be smaller.

Figure 2:
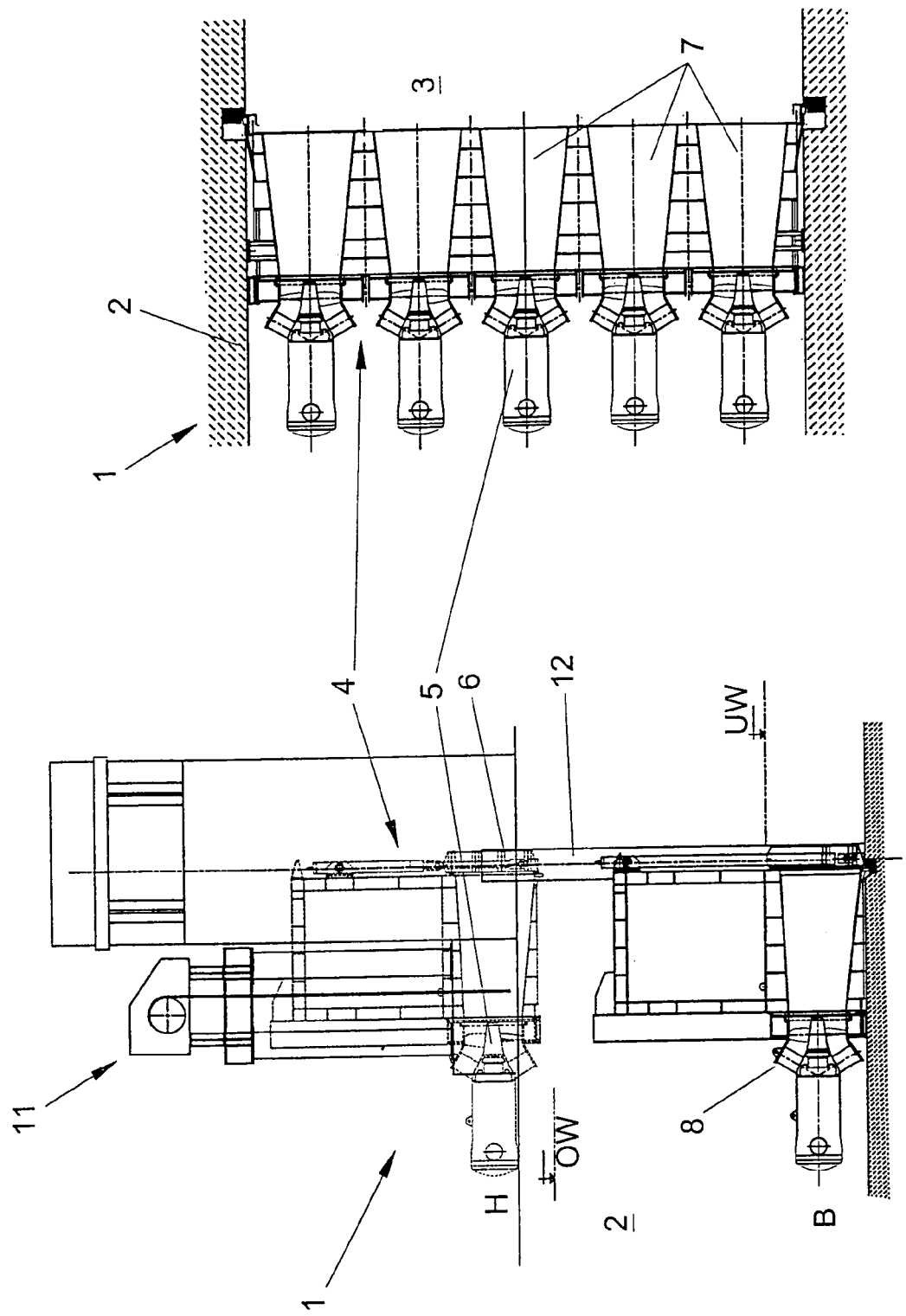
FIG. 2 illustrates a plan and side view of a further embodiment of the system according to the invention.

FIG. 2 shows an exemplary embodiment in which module 4 forms a unit together with suction tubes 7, such that both elements are raised as an entity. Since, of course, module 4 is considerably longer as a consequence of this, two guides 12 are in this case provided on each side of fixed-position structure 2, thus preventing module 4 from tilting while it is being raised. Furthermore, an auxiliary guide 6 is again provided, which once again allows module 4 to be raised in a guided manner beyond the upper edge of fixed-position structure 2. Otherwise, of course, what has already been stated with regard to FIG. 1 also applies to the example shown in FIG. 2.

Lifting device 11 may in this case be an already existing lifting device 11 which, if necessary, can be adapted for the new task, or else it may be a newly installed lifting device 11.

In order to avoid leakage losses and hence energy losses, module 4 can be sealed by appropriate sealing devices, which have been known for a long time, with respect to the surrounding fixed-position structures 2 and base structure 3. This ensures that all of the available medium flows through turbine generator unit 5 and is used for generation of electrical power.

Module 4 is preferably designed such that each turbine generator unit 5 can be replaced individually. Such replacement may in this case even be carried out in situ, so that virtually all the necessary maintenance work can be carried out in situ after insertion of module 4 into waterway 1.

A closure device could, of course, also be provided upstream of module 4, making it possible to close off the flow of the medium through the waterway completely, when required. An opened lock, for example, already has a device such as this with the lock gates, which could be used in a corresponding manner.

This "extension" of the guidance for module 4 thus also makes existing waterways accessible in which until now it has not been possible to use modules 4 such as these since module 4 could not be raised sufficiently far out of waterway 1. This can now be used in order to convert waterways such as these to devices for generation of electrical power.

For this purpose, if not already available, guides 12 are mounted in the already existing fixed-position structures 2, or fixed-position structures 2 are appropriately converted. Furthermore, the auxiliary guides 6 are installed, which ensure reliable lifting over the entire lifting range. After this, the preferably prefabricated module 4 can be inserted into guides 6 and 12 and can be lowered into operating position B. This could be done using lifting device 11 which may already be available or is installed retrospectively. If required, module 4 can also be sealed by corresponding sealing devices, which have been known for a long time, with respect to the surrounding fixed-position structures 2 and base structure 3.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A device for generating electrical power from a flowing medium, comprising:
   a number of turbine generator units connected to one another to form at least one module;
   at least two fixed-position structures structured and arranged essentially alongside each other to form a part of a waterway;
   said at least one module being structured and arranged between said at least two fixed-position structures to be raised and lowered, whereby a high water level is produced upstream of said at least one module and a low water level is produced downstream of said at least one module;
   at least one auxiliary apparatus provided on each of said two fixed-position structures that extends above an upper edge of said fixed-position structures;
   a lifting device structured and arranged to lift said at least one module, which is guided, at least partially, by said at least one auxiliary apparatus, such that, in a lifting procedure, said least one module is raised above said upper edges of said fixed-position structures.

2. The device in accordance with claim 1, wherein, in the lifting procedure, said at least one module is raised out of the flowing medium.

3. The device in accordance with claim 2, wherein said at least one module is raised out of the flowing medium when a high water level is maximum.

4. The device in accordance with claim 1, wherein said lifting device is guided at least partially in said auxiliary apparatus.

5. The device in accordance with claim 1, wherein the flowing medium is water.

6. The device in accordance with claim 1, wherein at least one module is composed of said number of turbine generator units arranged at least one of one above the other and alongside one another.

7. The device in accordance with claim 6, wherein said number of turbine generator units forming said at least one module are connected to one another.

8. The device in accordance with claim 1, wherein said lifting device is structured to raise said at least one module from a lowered operating position in a flow into a raised position in which said at least one module is entirely outside the flow.

9. The device in accordance with claim 8, further comprising a suction tube connected to and downstream from at least one of said number of turbine generator units, when said at least one module is in the operating position.

10. The device in accordance with claim 9, wherein said at least one module is structured and arranged so that it is raised and lowered together with said suction tube.

11. The device in accordance with claim 9, wherein said suction tube is closed.

12. The device in accordance with claim 1, further comprising guide devices located in said fixed-position structures, wherein said at least one module is raised and lowered in said guide devices at least in an area of said fixed-position structures.

13. The device in accordance with claim 8, further comprising a base structure being positionally fixed in the operating position, wherein at least one of said at least one module and a suction tube are arranged to rest on said base structure.

14. The device in accordance with claim 13, further comprising a sealing device located at least one of on said fixed-position structures, on said base structure, on said at least one module, and on said suction tube,
   wherein said sealing device essentially prevents flow between at least one of said at least one module, said suction tube, said fixed-position structures, and said base structure.

15. The device in accordance with claim 1, wherein at least one of said number of turbine generator units of said at least one module is structured and arranged to be disconnectable from said at least one module.

16. A process for converting a waterway into a system for generating electrical power from a flowing medium, said process comprising:
   arranging at least one auxiliary device on each of at least two fixed-position structures located in the waterway, such that the at least one auxiliary devices extend above upper edges of the at least two fixed-position structures; and
   inserting at least one module, composed of a plurality of turbine generator units, between the auxiliary devices.

17. The process in accordance with claim 16, further comprising:
   selectively raising and lowering the at least one module positioned between the auxiliary devices.

18. The process in accordance with claim 16, further comprising:
   selectively raising and lowering the at least one module between at least one of the at least two fixed-position structures and the auxiliary devices.

19. The process in accordance with claim 18, further comprising:
   raising the at least one module above the upper edges of the two fixed-position structures.

20. The process in accordance with claim 19, wherein, when the at least one module is raised above the upper edges of the two fixed-position structures, the at least one module is raised out of the flowing medium.

21. The process in accordance with claim 20, wherein the at least one module is raised out of the flowing medium even when a high water level of the waterway is at a maximum.

22. The process in accordance with claim 16, wherein the at least two fixed position structures are arranged alongside each other.

23. The process in accordance with claim 16, further comprising positioning a lifting device on the waterway to raise and lower the at least one module.

24. The process in accordance with claim 16, wherein the at least one module is formed by the plurality of turbine generator units arranged at least one of one above the other and alongside one another, and connected to one another.

25. The process in accordance with claim 16, wherein the at least one module is insertable into the auxiliary devices to be at least partially raised and lowered.

26. The process in accordance with claim 16, wherein a suction tube is connected to and downstream from at least one of said plurality of turbine generator units of said at least one module, and said at least one module is raised and lowered together with the suction tube.

27. The process in accordance with claim 26, wherein the at least one suction tube is arranged in the waterway in such a manner that the suction tube interacts with at least of the plurality of turbine generator units in an operating position.

28. The process in accordance with claim 27, wherein, in the operating position, an essentially continuous flow channel is produced from a high water level through the at least one turbine and the suction tube to the low water level.

29. The process in accordance with claim 27, wherein the suction tube remains in the waterway while the at least one module is raised.

30. The process in accordance with claim 16, wherein the two fixed-position structures include guide devices, and the at least one module is guided to be raised and lowered in the guide devices.

31. The process in accordance with claim 16, wherein the lifting device is attached to the two fixed-position structures.

32. The process in accordance with claim 16, wherein, at least when the at least one module is in an operating position, the process further comprises sealing a space at least one of between the at least one module and a base structure and between the at least one module and the fixed-position structure.

33. The process in accordance with claim 32, wherein the space is sealed is essentially liquid-tight.

* * * * *